3,121,107
PROCESS FOR PREPARATION OF ALKOXY
SUBSTITUTED AROMATIC NITRILES
Myron S. Simon, Newton Center, and Warren E. Solodar, Waltham, Mass., assignors to Polaroid Corporation, Cambridge, Mass., a corporation of Delaware
No Drawing. Filed June 29, 1961, Ser. No. 120,480
3 Claims. (Cl. 260—465)

This invention is concerned with a novel chemical synthesis, and more particularly with a novel synthesis of aromatic nitriles from aromatic aldehydes.

Accordingly, a principal object of this invention is to provide a new and highly useful synthesis of aromatic nitriles from aromatic aldehydes.

A further object of this invention is to provide a simplified synthesis of alkoxy-substituted aromatic nitriles from the corresponding aromatic aldehydes.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

It has now been found that aromatic nitriles, and particularly alkoxy-substituted aromatic nitriles, may be readily and simply synthesized in one-step reaction from the corresponding aromatic aldehyde. In accordance with this synthesis, an aromatic aldehyde corresponding to the desired aromatic nitrile is refluxed in a mixture of a nitroalkane, e.g., nitroethane, acetic acid and an ammonium salt, e.g., ammonium acetate.

The following nonlimiting examples will illustrate the invention.

*Example 1*

2,5-dibenzyloxy-benzaldehyde (3.5 g.) was refluxed for 20 hours in a mixture of nitroethane (1.6 ml.), acetic acid (20 ml.) and ammonium acetate (1.7 g.). Work up of the reaction mixture gave 2,5-dibenzyloxy-benzonitrile (0.9 g., 26% yield, M.P. 104–107° C.) which, when recrystallized from ethanol (M.P. 108–110° C.), analyzed as follows:

|  | C | H | N |
|---|---|---|---|
| Calculated (for $C_{21}H_{18}NO_2$) | 79.7 | 5.7 | 4.4 |
| Found | 79.7 | 5.7 | 4.5 |

The infrared absorption spectrum of the product showed a nitrile band at 2238 cm.$^{-1}$. The spectral absorption curve exhibited peaks at 234 m$\mu$ ($\epsilon$=16,800) and 319 m$\mu$ ($\epsilon$=6600).

*Example 2*

The procedure described in Example 1 was repeated using 2,5-dimethoxy-benzaldehyde. The infrared absorption spectrum of this product also showed a nitriole band (2230 cm.$^{-1}$).

It has been found that omission of the nitroethane causes the reaction to fail under conditions where it otherwise goes readily. In addition, the crude reaction product from the reaction with benzaldehyde under similar conditions shows no nitrile band in the infrared. It therefore appears that the presence of a nuclear substituent may be necessary.

It will be understood that reference to alkoxy-substituted aromatic aldehydes is intended to include compounds where the alkyl part of the alkoxy group is further substituted, e.g., benzyloxy.

Since certain changes may be made in the above process without departing from the scope of the invention herein involved, it is intended that all matter contained in the above description shall be interpreted as illustrative and not in a limiting sense.

What is claimed is:

1. The process which comprises refluxing a nuclear-substituted benzaldehyde, a lower nitroalkane, acetic acid, and ammonium acetate, said nuclear-substituted benzaldehyde being selected from the group consisting of 2,5-dimethoxy-benzaldehyde and 2,5-dibenzyloxy-benzaldehyde, and recovering the corresponding nuclear-substituted benzonitrile.

2. The process which comprises refluxing 2,5-dibenzyloxy-benzaldehyde, nitroethane, acetic acid, and ammonium acetate, and recovering 2,5-dibenzyloxy-benzonitrile.

3. The process which comprises refluxing 2,5-dimethoxy-benzaldehyde, acetic acid, nitroethane, and ammonium acetate, and recovering 2,5-dimethoxy-benzonitrile.

References Cited in the file of this patent

Blatter et al.: J. Am. Chem. Soc., vol. 83, p. 2203, May 5, 1961. (Copy in Scientific Library.)